US009798822B2

(12) United States Patent
Liu et al.

(10) Patent No.: US 9,798,822 B2
(45) Date of Patent: Oct. 24, 2017

(54) LOCATION BASED GROUPING OF BROWSING HISTORIES

(75) Inventors: Alice Liu, San Jose, CA (US); Gavin Barraclough, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 801 days.

(21) Appl. No.: 12/826,540

(22) Filed: Jun. 29, 2010

(65) Prior Publication Data

US 2011/0320450 A1   Dec. 29, 2011

(51) Int. Cl.
*G06F 17/30* (2006.01)

(52) U.S. Cl.
CPC .... *G06F 17/30876* (2013.01); *G06F 17/3087* (2013.01); *G06F 17/3028* (2013.01); *G06F 17/30241* (2013.01); *G06F 17/30991* (2013.01); *G06F 2221/2111* (2013.01)

(58) Field of Classification Search
CPC .......... G06F 17/3087; G06F 17/30876; G06F 17/30241; G06F 17/30884; G06F 17/3028; G06F 17/30321; G06F 17/30905; G06F 17/30991; G06F 2221/2111
USPC ... 707/1, 100, 103, 737, 705, 708, 736, 751, 707/765; 715/234, 745, 825
See application file for complete search history.

(56) References Cited

U.S. PATENT DOCUMENTS

| | | | |
|---|---|---|---|
| 6,677,894 B2 * | 1/2004 | Sheynblat et al. | 342/357.46 |
| 7,249,100 B2 * | 7/2007 | Murto et al. | 705/50 |
| 7,251,775 B1 * | 7/2007 | Astala et al. | 715/205 |
| 7,747,625 B2 * | 6/2010 | Gargi et al. | 707/737 |
| 7,801,950 B2 * | 9/2010 | Eisenstadt et al. | 709/203 |
| 7,908,282 B2 * | 3/2011 | Naick et al. | 707/752 |
| 7,908,559 B1 * | 3/2011 | Denise | 715/738 |
| 7,925,995 B2 * | 4/2011 | Krumm et al. | 715/855 |
| 7,962,843 B2 * | 6/2011 | Milic-Frayling et al. | 715/206 |
| 8,108,144 B2 * | 1/2012 | Forstall et al. | 701/426 |
| 8,135,777 B2 * | 3/2012 | Colligan et al. | 709/203 |
| 8,229,914 B2 * | 7/2012 | Ramer et al. | 707/709 |
| 8,599,203 B2 * | 12/2013 | Horowitz et al. | 345/440 |
| 8,635,219 B2 * | 1/2014 | Chakra et al. | 707/736 |
| 9,607,092 B2 * | 3/2017 | Kreitler | G06F 17/3087 |
| 2005/0228860 A1 * | 10/2005 | Hamynen et al. | 709/203 |
| 2007/0006098 A1 * | 1/2007 | Krumm | G06F 17/3087 715/825 |

(Continued)

OTHER PUBLICATIONS

U.S. Appl. No. 12/699,733, filed Feb. 3, 2010, titled "Automatic Organization of Browsing Histories", by inventor Jing Jin, et al., 41 pages (specification and drawings).

(Continued)

*Primary Examiner* — Dangelino Gortayo
(74) *Attorney, Agent, or Firm* — Fish & Richardson P.C.

(57) ABSTRACT

Methods and systems that present URLs from a history of records organized by locations are described. Each record may be stored to represent a URL accessed for retrieving a web page by a browser hosted in a device at a certain point in time. Additionally, the record may include a location data indicating a physical location of the device at the certain point in time. Optionally, a timestamp indicating the certain point in time may be included in the record. Groups of the records may be clustered according to the locations. In one embodiment, at least one of the groups may be selected for presentation on a display according to where the display is currently located.

20 Claims, 12 Drawing Sheets

(56) References Cited

U.S. PATENT DOCUMENTS

| | | |
|---|---|---|
| 2007/0220441 A1 | 9/2007 | Melton et al. |
| 2008/0046840 A1* | 2/2008 | Melton ............. G06F 17/30864 715/825 |
| 2009/0216435 A1* | 8/2009 | Zheng et al. ................. 701/209 |
| 2009/0327913 A1 | 12/2009 | Adar et al. |
| 2010/0057739 A1 | 3/2010 | Charka et al. |
| 2010/0161720 A1* | 6/2010 | Colligan et al. .............. 709/203 |
| 2010/0241507 A1* | 9/2010 | Quinn et al. ................ 705/14.42 |
| 2010/0287178 A1* | 11/2010 | Lambert et al. .............. 707/765 |
| 2010/0306249 A1* | 12/2010 | Hill ................... G06F 17/30867 707/769 |
| 2011/0010336 A1* | 1/2011 | Johnson et al. ............. 707/609 |
| 2011/0072015 A1* | 3/2011 | Lin et al. ..................... 707/737 |

OTHER PUBLICATIONS

Geolocation API Specification, W3C Working Draft Jul. 7, 2009,http:www.w3.org/TR/geolocation-API, 8 pgs.

* cited by examiner

LOCATION BASED GROUPING OF BROWSING HISTORIES

BACKGROUND OF THE INVENTION

The Internet and particularly the world wide web (also known as merely the web) is a tremendous source of information accessible via a browser. Often, a user of the browser may browse the web looking for information related to where the user is located. For example, a user may browse the web for personnel hobbies at home, but search for work related web pages in the office. Over a period of time, a user may collect a browsing history including a variety of URLs (Universal Resource Locators) accessed by the user from different locations which are not reflected in conventional browser histories.

A conventional web browser, such as Safari from Apple Inc. of Cupertino, Calif. or Internet Explorer from Microsoft Corporation of Redmond, Wash., includes a history list that provides a linear temporal list of web pages visited without regard to where a user visited these web pages. As a result, a user may need to pore through the history list in a conventional web browser to identify which web pages have been accessed by the user at a certain location, which tends to be error prone, time consuming, and inconvenient.

Therefore, browsing histories in traditional browsers do not allow a user to access web pages visited from different locations in an accurate, efficient and user friendly manner.

SUMMARY OF THE DESCRIPTION

An embodiment of the present invention can include methods and systems that present URLs from a history of records organized by locations. Each record may be stored to represent a URL accessed for retrieving a web page by a browser hosted in a device at a certain point in time. Additionally, the record may include a location data indicating a physical location of the device at the certain point in time. Optionally, a timestamp indicating the certain point in time may be included in the record. Groups of the records may be clustered according to the locations. In one embodiment, at least one of the groups may be selected for presentation on a display according to where the display is currently located.

In one embodiment, a history of records associated with URLs and location data may be collected as a result of browsing web pages or content addressed by the URLs from different locations indicated by the location data. Zero or more groups of the records may be identified according to location based clustering. In response to a request to present the history of records, a current location of a device may be determined to select certain records for presentation. In some embodiments, the presentation may include a map showing the selected records as a cluster having a physical area covering the current location. Optionally, the map may indicate the current location and/or separate areas covered by separate groups of records identified by the clusters.

In another embodiment, in response to receiving a request from a device for a history of records, a current location of the device may be determined. Each record in the history may be associated with a location data and a timestamp indicating where and when the record was recorded. Clustering analysis may be performed to group the records into one or more clusters using the location data. Records may be selected according to spatial relationships between the current location of the device and the clusters. Subsequently, the selected records may be forwarded or sent to the device.

In yet another embodiment, human readable default names may be generated for location based clusters identified from a history of records including location data. A map window may be presented on a screen showing the history of records organized by the identified location based clusters. The default names may represent the location based clusters via human readable addresses identifying neighborhoods of the clusters according to map data. The map window may enable editing of the default names.

Systems which can perform any one of these methods and machine readable storage media which can cause a system to perform any one of these methods are also described herein.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
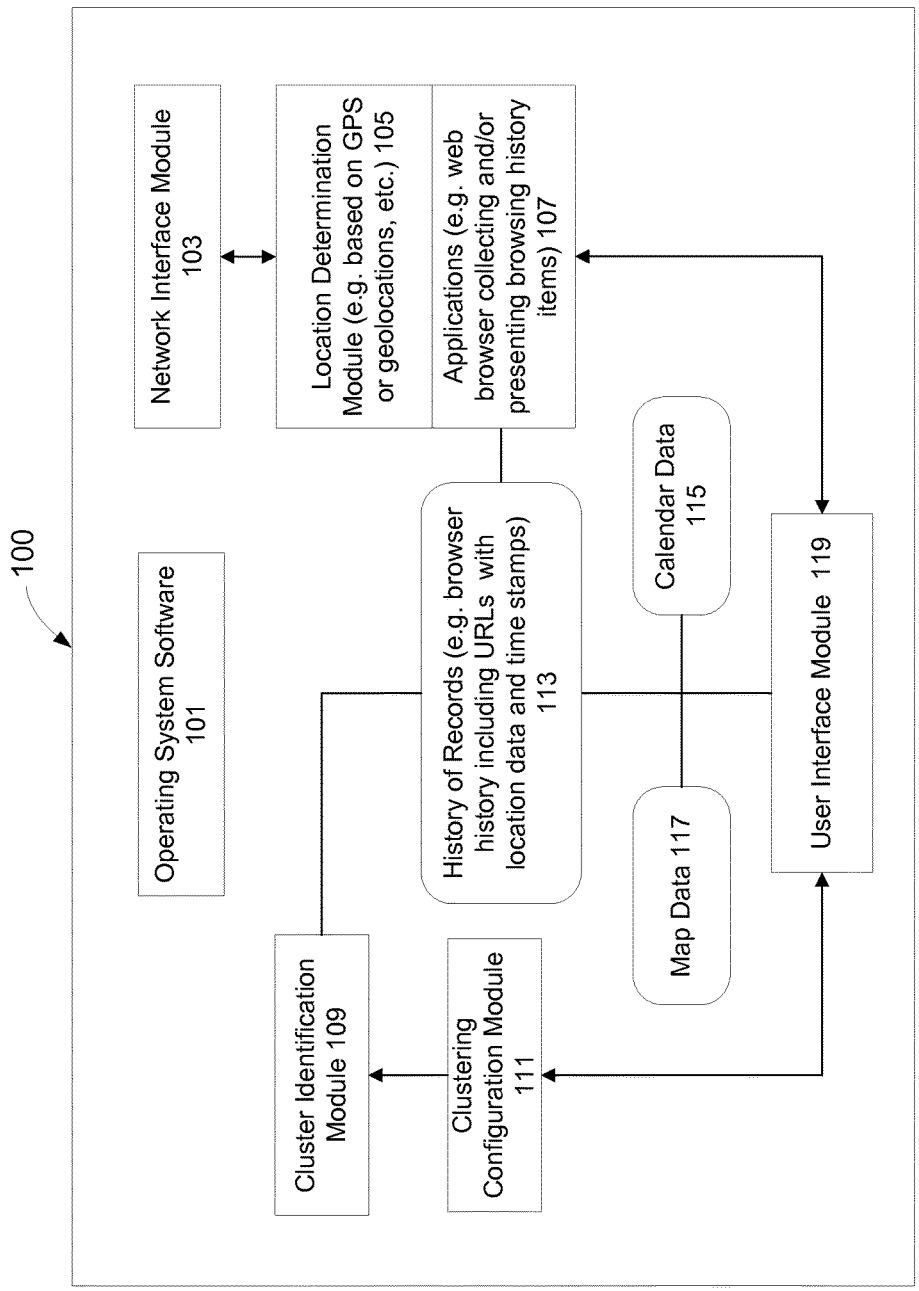
FIG. 1 is a block diagram illustrating an exemplary system for one embodiment of the present invention which may be implemented in software.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

In one embodiment, location data for geolocation assisted browsing history would be recorded upon loading of web pages to indicate where the web pages were accessed. Real-world geographic location of an object, such as a cell phone or an Internet-connected computer terminal may be identified by the location data including general location information such as a geolocation. Geolocation may refer to the practice of assessing the location of an object, or to the actual assessed location. A meaningful location (e.g. a street address) rather then just a set of geographic coordinates may be determined based on a geolocation.

For example, separate browsing histories for work and home locations may be built for a user using a browser. When the user is at home, the home browsing history may be presented by default while hiding the work browsing history. Optionally, the user may manually switch to different location's browsing history and/or choose to view multiple browsing histories from different locations (e.g. all browsing histories). Thus, the same browser running in the same device may present different browsing histories depending on where the device is located. In certain embodiments, browsing histories (or entities such as book marks, notes, records etc.) collected by multiple devices at different locations at different points in time may be synchronized for presentation in a device based on where the device is currently located.

Multiple locations in a history of location based data (e.g. browsing history) may be grouped together as a location based cluster. For example, multiple URLs in a browsing history recorded at different locations via a device carried by a user moving around an office may be clustered as a group for a work area. In one embodiment, locations belonging to one cluster may be separated in distance less than a certain threshold number, such as one mile. Heuristics (e.g. rules) and/or clustering algorithms may be applied to decide which locations should be clustered together. Non-clustered location based history items (e.g. outlier items) not belonging to any location based cluster may be manually assigned to one of the clusters by a user.

In one embodiment, URLs in a browsing history may be filtered for presentation based on where a device is located. Optionally, the URLs may have already been grouped into one or more location based clusters in the browsing history. A cluster of the URLs most close to the current location of the device may be selected for presentation while the rest of the URLs may be filtered out. Alternatively, the URLs may be dynamically clustered in response to a user request for presenting the browsing history. In some embodiments, presentation of the location based URLs may include time based relationships, such as listed according to time, date, week, month, year . . . etc.

FIG. 1 is a block diagram illustrating an exemplary system for one embodiment of the present invention which may be implemented in software. In one embodiment, system 100 may include an operating system software 101, e.g., to support operations as a mobile device, a phone device, a desk top computer or a backend server. System 100 may be coupled with one or more networks, such as wired or wireless networks, cellular networks, Ethernets, Internet, or other networks, via network interface module 103. Location determination module 105 may provide current location information of a device hosting system 100. Location information may be based on GPS (Global Positioning System) or geolocations, such as described in "Geolocation API Specification" by W3C, Feb. 10, 2010. In some embodiments, location determination module 105 may interact with a remote device to determine a current location of the remote device.

Applications 107 may generate records for histories of records 113 (e.g. stored in a mass storage device, a memory, a flash memory, or other storage components etc.) over time. For example, applications 107 may include a web browser storing browsing histories based on web pages or URLs visited. Each record may be a data structure containing an application specific data (e.g. a URL), a timestamp and a location data. The location data may be GPS or geolocation based information indicating where a corresponding record was collected. The timestamp may include date and/or time information indicating when the corresponding record was collected, such as when the location data was received for the corresponding record. For example, a browser running in a device may access a URL to generate a browsing record including the URL, the location data and the timestamp indicating where and when the browser in the device accessed the URL. For example, the timestamp may indicate when a request for the URL was sent from the device.

History of records 113 may include a plurality of records collected from one or more applications running in one or more devices over a period of time. For example, history of records 113 may include browsing histories synchronized from multiple devices. In one embodiment, a synchronization server may provide synchronization service to synchronize records collected by different devices at different locations during different periods of time. Alternatively, system 100 may communicate with one or more separate devices to synchronize history of records 113 among different devices.

In some embodiment, applications 107 may generate a record without timestamps and/or location data for history of records 113. For example, system 100 and/or applications 107 may include options to enable/disable attaching timestamps and/or location data for a user to control different levels of privacy settings. In one embodiment, system 100 may disable location determination module 105 to block generating location data according to a user configuration. As a result, application 107 may generate a record without a location data for history of records 113.

In one embodiment, cluster identification module 109 of system 100 may identify one or more groups of records from history of records 113 based on location data associated with each record. Cluster identification module 109 may perform record grouping operations on requests, e.g. initiated by applications 107 for presenting history of records 113 via user interface module 119. Alternatively, cluster identification module 109 may incrementally identify (or update) groups of records from history of records 113 based on location data in response to a newly generated record. In some embodiments, cluster identification module 109 may determine that one or more records of history of records 113 do not belong to any group currently identified.

Cluster identification module 109 may perform location based clustering analysis using clustering algorithms for record group identification. Clustering analysis may be customized via configurations setup via clustering configuration module 111, e.g. to allow a user to enter preferences via user interface module 119. Different location based groups may be identified from history of records 113 depending on the configurations. For example, a configuration may include a maximum radius distance required for a group (or cluster), a minimum number of records required to form a group, a minimum distance between two different groups (e.g. based on a cluster location representing a group of records), named locations in a map, etc. Other configuration settings may apply. In one embodiment, clustering parameters for the clustering analysis may be automatically configured transparent (e.g. not exposed) to a user without a need for user configuration.

User interface module 119 may present history of records 113 using location based groupings specified via cluster identification module 109. In one embodiment, map data 117 may include global or local maps covering at least a portion of records in history of records 113 to facilitate presenting the records. Additionally, user interface module 119 may determine chronological relationships among records, e.g. within one location based group or cluster, based on timestamps associated with the records. Calendar data 115 may include calendar information (e.g. year, month, week, day, hour etc.) to provide a time related context for user interface module 119 to present chronological relationships among the records, e.g. within one location based group.

Figure 2:
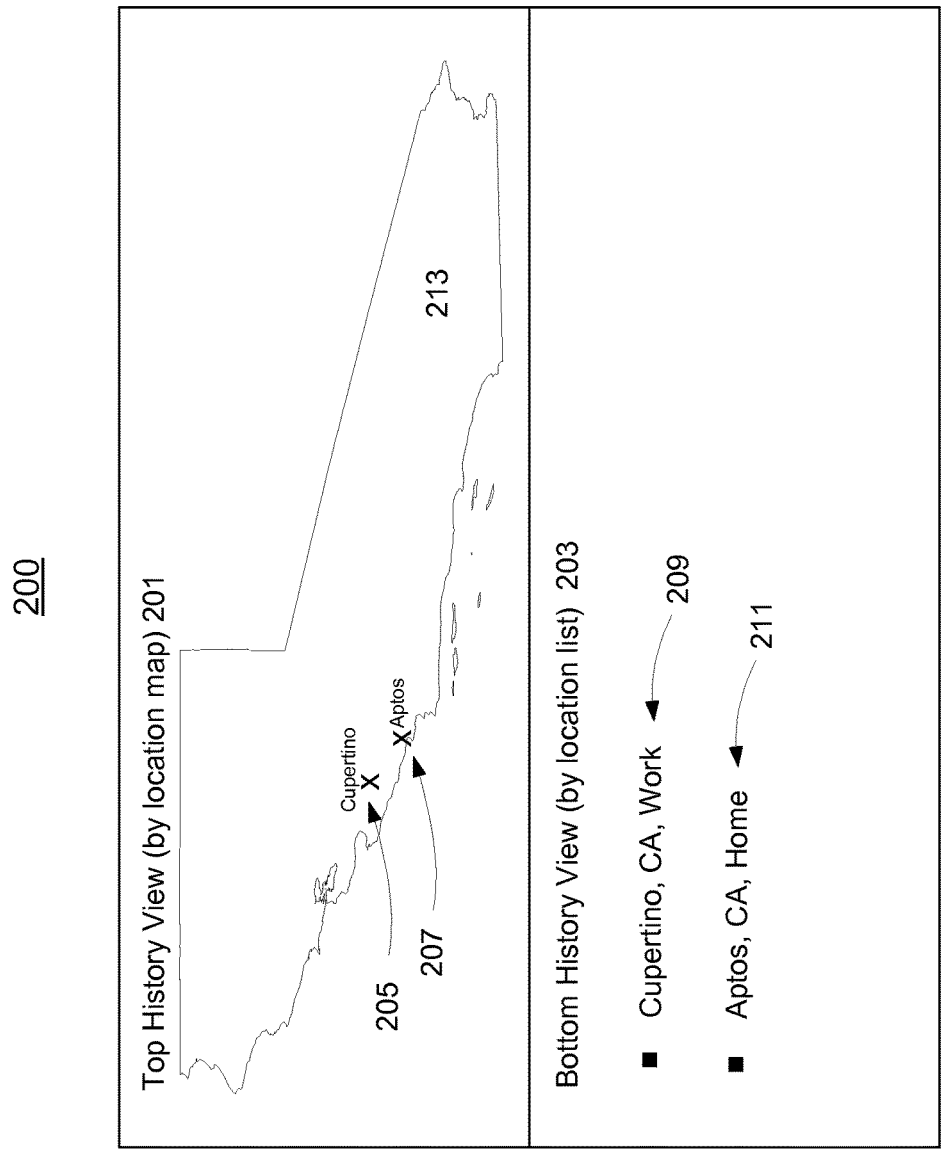
FIG. 2 illustrates an exemplary user interface including a map according to one embodiment of the present invention.

FIG. 2 illustrates an exemplary user interface including a map according to one embodiment of the present invention. For example, interface 200 may be generated based on system 100 of FIG. 1. Interface 200 may include two windows simultaneously presented as separate views, top history view 201 and bottom history view 203, on a display screen for a history of records based on location data, such as history of records 113 of FIG. 1. Top history view 201 may include a map 213 covering, for example, a current location (not shown) of a device presenting interface 200. Groups of records identified from the history of records based on location data may be presented in a location map via top history view 201 and correspondingly in a location list via bottom history view 203.

In one embodiment, two groups of records clustered based on location data may be marked as Cupertino 205 and Aptos 207 in map 213 of top history view 201. Cupertino 205 may indicate a cluster location for a corresponding group of records. In one embodiment, Cupertino 205 may be presented with an actual location name (county name, city name, street name . . . ) selected from map 203 according to the cluster center of the corresponding group of records (e.g. closest to the cluster center). Cupertino 205 and Aptos 207 may be markings representing clusters of records based on, for example, centroids of corresponding clusters.

Location based groups of records represented by Cupertino 205 and Aptos 207 may be presented as a list of named items, correspondingly as work 209 and home 211 in bottom history view 203. Each named item in the list may include further elaboration of the corresponding group, such as "Cupertino, Calif., Work" for work 209 to indicate a group of records (e.g. URLs of browsing history) collected at locations close to work, which is near city of Cupertino in state of CA (California). Similarly, "Aptos, Calif., Home" for home 211 may represent a group of records collected at locations close to home, which is near city of Aptos in state of CA. In some embodiments, the list in bottom history view 203 may be sorted according to relative distances of cluster locations for each list item relative to a current location of a device. For example, a device presenting interface 200 may be currently located closer to a cluster location of work 209, e.g. located according to Cupertino 205, than home 211, e.g. located according to Aptos 207. As a result, work 209 may be listed before home 211 in a top down listing order in bottom history view 203.

Figure 3:
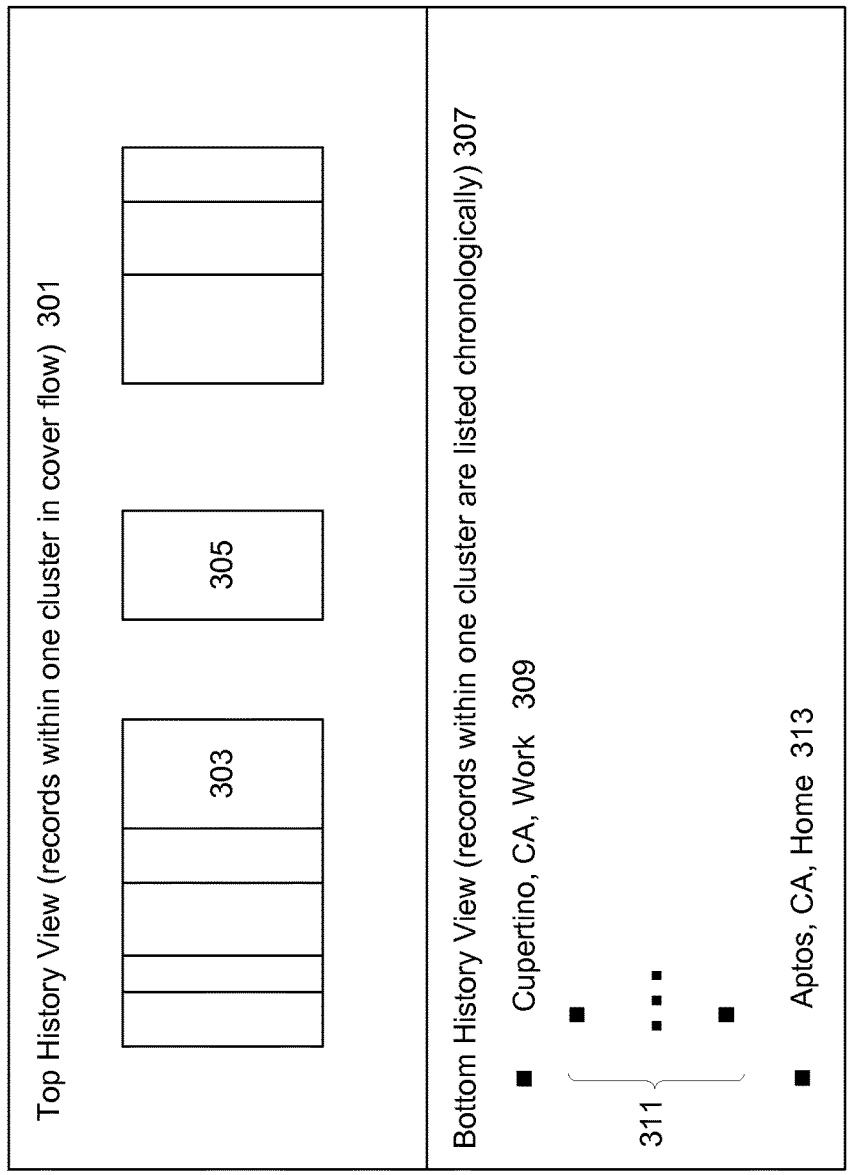
FIG. 3 illustrates an exemplary user interface including a record list according to one embodiment of the present invention.

FIG. 3 illustrates an exemplary user interface including a record list according to one embodiment of the present invention. For example, interface 300 may be generated based on system 100 of FIG. 1. Interface 300 may include two windows simultaneously presented as separate views, top history view 301 and bottom history view 307, on a display screen for a history of records based on location data, such as history of records 113 of FIG. 1. In one embodiment, a user interface control may be provided to allow a user to switch location based presentations via interface 300 or interface 200 of FIG. 2 for a history of records.

Bottom history view 307 may include a list 311 representing records included in a group of records as work 309. List 311 may be expanded from work 309 (e.g. in response to receiving a user instruction such as a mouse click) to present each record in a group or cluster of records corresponding to work 309 in an ordered manner. In one embodiment, list 311 may indicate a chronological order based on the timestamp in each record of a group identified by a location based cluster corresponding to work 309. List 311 may be ordered according to a current location of a device, such as relative distances between location data associated with corresponding records for work 309 and the current location. Other orders may apply. A user interface may be provided for a user to switch among different manners for presenting list 311. In some embodiments, additional information, such as calendar information may be displayed to provide further time/date related context.

List 311 may be an expanded list representing a location based cluster of records in bottom history view 307. A cover flow view in top history view 301 may supplement the bottom history view 307 for the same cluster of records. In one embodiment, the cover flow may include pages of graphical views (e.g. as web pages), such as pages 303 305 arranged in a manner resembling the cover flow view which exists in iTunes. Each page may correspond to a record (e.g. a URL in a browsing history) for an item of list 311. This would allow a user to see, through the cover flow view, all the web pages within a particular location based cluster.

A user can, using techniques known in the art, move the pages in top history view 301. As is known in the art, the pages can move from left to right and in reverse in response to user inputs, and one page, in this case page 305, can be shown in isolation (e.g. by itself with no other page obscuring its content). Typically, pages of top history view 301 and corresponding list 311 of bottom history view 307 are presented in consistent orders. As a result, changes in the listing order for list 311 (e.g. as instructed by a user interface request) may cause similar changes in the presentation order of corresponding pages in top history view 301. Further details in connection with the cover flow view are described in pending U.S. application Ser. No. 11/760,759, filed Jun. 9, 2007 by inventor Yan Arrouye, which application is incorporated herein by reference.

Figure 4:
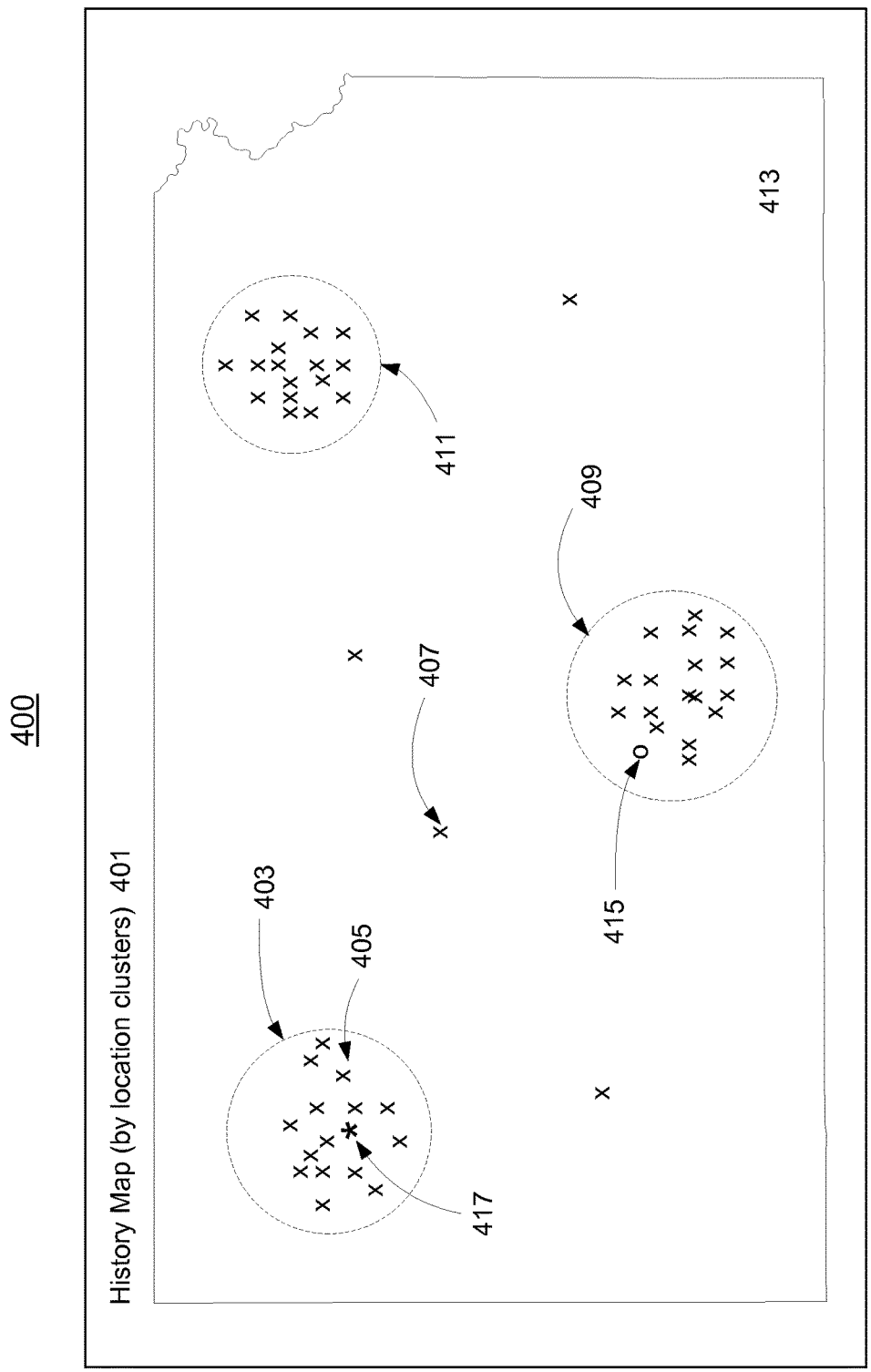
FIG. 4 illustrates an exemplary user interface including clusters according to one embodiment of the present invention.

FIG. 4 illustrates an exemplary user interface including clusters according to one embodiment of the present invention. For example, interface 400 may be generated based on system 100 of FIG. 1. Interface 400 may include history map 401 presented as a view on a display screen for a history of records based on location data, such as history of records 113 of FIG. 1. In one embodiment, history map 401 may be one of multiple views of a history of records simultaneously presented, such as view 201 of FIG. 2. History map may include map 413 selected to provide a spatial area large enough to cover locations associated with a history of records (e.g. URLs of browsing history) and, optionally, a current location of a device, such as the device displaying interface 400. A user may be allowed to zoom in/out or move in different directions over history map 401 using well known interface mechanisms for map navigations.

In one embodiment, history map 401 may include markings representing records in a history of records according to where the records are located based on associated location data. For example, markings 405 407 can correspond to two separate locations where two URLs (i.e. records) in a browsing history were collected by browsers. Optionally, history map 401 may indicate where a current location of a device is, such as via marking 415. In one embodiment, location based clusters may be identified as groups of the history of records via clustering analysis using location based clustering algorithms. For example, history map 401 may indicate three groups of records identified as clusters 403, 409 and 411. A record in one embodiment may belong to at most one cluster. In some embodiments, a record may belong to more than one clusters including, for example, a meta cluster having more than one smaller clusters. A history record with location data could be part of a cluster and also part of a larger cluster such as a meta cluster to which said cluster belongs as a sub cluster. As an example, a user who travels between San Francisco, Los Angeles, and Shanghai may be associated with a history of browsing records which are clustered for each of these cities. Each cluster for one of the cities can belong to one of two meta clusters for United States and China. In some embodiments clustering analysis may determine a record cannot be assigned to any cluster or group (e.g. an outlier), such as indicated by marking 407. History map 401 may show a cluster location representing a group of records in a cluster, such as marking 417 for cluster 403. A cluster location may geographically represent the records grouped by a cluster, such as based on a centroid determined from the location of each record within the cluster.

Figure 5:
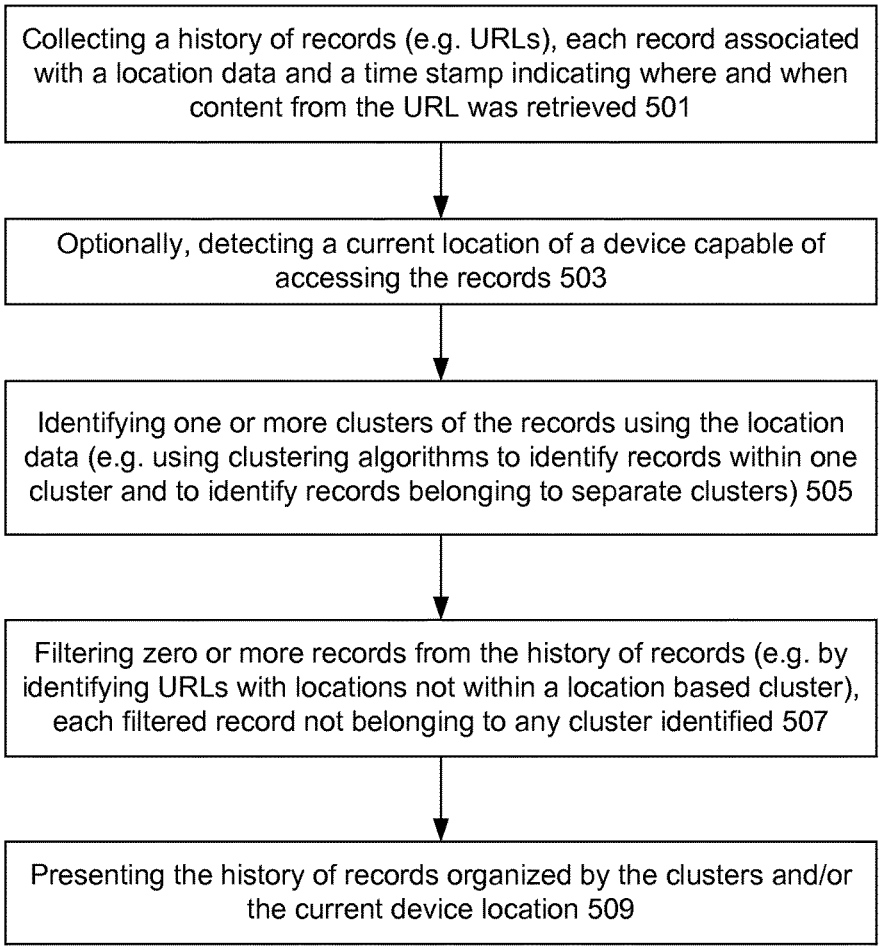
FIG. 5 is a flow diagram for presenting a history of URLs based on locations according to one embodiment of the invention.

FIG. 5 is a flow diagram for presenting a history of URLs based on locations according to one embodiment of the invention. Exemplary process 500 may be performed by a processing logic that may comprise hardware (circuitry, dedicated logic, etc.), software (such as is run on a dedicated machine), or a combination of both. For example, process 500 may be performed by some components of system 100 of FIG. 1. At block 501, the processing logic of process 500 can collect a history of records (e.g. URLs) over a period of time, each record associated with a location data and a timestamp indicating where and when content of the URL was retrieved and/or the record was generated.

For example, the processing logic of process 500 may perform browsing operations to access content of a web page according to a URL, such as entered or registered by a user, and generate a data structure (or record) specifying the URL as a result of the browsing operations. The timestamp may indicate when the content was accessed and/or the record was generated. The record may include a location data determined at substantially the time the record was created. Location data may be associated with latitude and longitude to specify where a device hosting the browsing operations was located when a corresponding record for browsing URL was generated. Sources of location data may include GPS, geolocations extracted from network signals, and/or user inputs. The processing logic of process 500 may retrieve or receive the history of records or a portion of the history of records from another device or server, locally or remotely coupled, e.g. via a network. For example, a record retrieved from a remote server may include a timestamp and a location data indicating a physical location of a separate device at the time corresponding to the timestamp. The remote server may be a synchronization server to store histories of records for multiple devices shared by one user (e.g. via a user account).

At block 503, in one embodiment, the processing logic of process 500 may optionally detect a current location of a device capable of accessing a history of records. For example, the current location may be associated with a device storing a browsing history for a browser. Alternatively, the current location may be associated with a device capable of retrieving a browsing history from a remote server for the browser. According to some embodiments, the current location of the device may be detected based on sources of location data including those sources, such as geolocations, GPSs, etc. providing location data for the history of records. The processing logic of process 500 may locate the device in response to a user request for presenting the history of records.

At block 505, the processing logic of process 500 may identify groups of records from a history of records based on location, for example, to present or filter the records. In one embodiment, the processing logic of process 500 may perform location based clustering analysis on the history of records for grouping the records as clusters. Clustering analysis may identify records similarly located within a physical area as a cluster according to a distance measure using associated location data. The distance measure may determine how the similarity of two records is calculated (e.g. the larger the distance measure, the less the similarity between the two records). Exemplary distance measures may be based on Euclidean distance, Manhattan distance, maximum norm, Mahalanobis distance, or Hamming distance, etc. Other distance measures may apply.

In one embodiment, at block 507, the processing logic of process 500 may filter a history of records according to location based clusters identified. The processing logic of process 500 may identify URLs with locations not within a location based cluster as selection criteria for filtering. For example, a record not assigned to any cluster or group, e.g. as a result of a clustering analysis, may be filtered from the history of records. In some embodiments, records belonging to one group or cluster may be required to be similar to each other according to a minimum similarity based on a selected distance measure, such as five miles of radius covering an area for a cluster. The minimum similarity and the selected distance measure may be configured via user settings.

In some embodiments, the user setting may include other configurations such as a minimum distance between two separate clusters, a minimum number of records within a cluster, and/or a maximum number of clusters, etc. Distances between different clusters may be measured between representative locations of the clusters. A representative location of a cluster may be based on a centroid of records within the cluster. The processing logic of process 500 may filter zero or more records from the history of records. For example each record not belonging to any of the clusters identified may be filtered.

At block 509, the processing logic of process 500 may present a history of records organized by location based clusters and/or a current device location. For example, the processing logic of process 500 may select one or more of the clusters to present records of the selected clusters without presenting (i.e. hiding) the rest of records in the history of records. Alternatively, the processing logic of process 500 may present the history of records organized or grouped according to the clusters and, optionally, ordered according to distances of the clusters to the current location of the device. In one embodiment, filtered records may not be presented. The processing logic of process 500 may present the history of records on a map overlaid with the location based clusters or groups, such as in interface 400 of FIG. 4. The processing logic of process 500 may indicate filtered records and/or the current location of a device on the map presented.

In one embodiment, the processing logic of process 500 may identify top sites representing most frequently visited URLs among one or more location based clusters of records. A top site may correspond to a collection of URLs which can be presented in a variety of views (e.g. a grid view). In one embodiment, the processing logic of process 500 may determine to pick out most frequently accessed URLs for top site selection after some accumulation of URL history records, such as when two or more location based clusters of records emerge among the history records. The processing logic of process 500 may produce separate top sites for different clusters. As a result, a user may be presented with an additional organization or view of the user's browsing history such as one list of top sites for work and another list of top sites for home, etc. The processing logic of process 500 may provide a top site based on a cluster of records in addition to an overall top site based on all collected records. In one embodiment, the processing logic of process 500 may analyze the clusters of records for selecting top sites in a similar manner as described in patent application Ser. No. 12/252,336 entitled "Selective History Data Structures", which is hereby incorporated by reference in its entirety.

Figure 6:
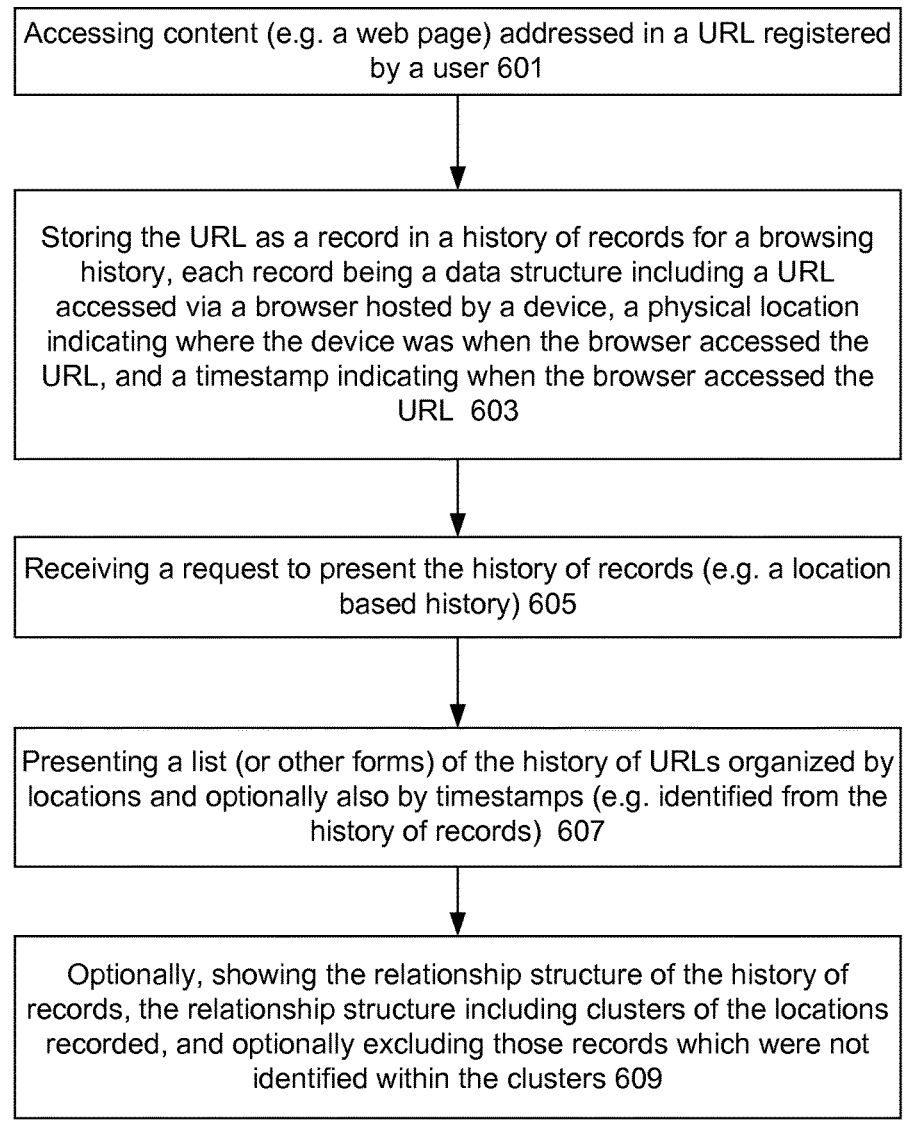
FIG. 6 is a flow diagram for collecting a history of URLs based on locations according to one embodiment of the invention.

FIG. 6 is a flow diagram for collecting a history of URLs based on locations according to one embodiment of the invention. Exemplary process 600 may be performed by a processing logic that may comprise hardware (circuitry, dedicated logic, etc.), software (such as is run on a dedicated machine), or a combination of both. For example, process 600 may be performed by some components of system 100 of FIG. 1. At block 601, the processing logic of process 600 can access content addressed in a URL registered by a user. For example, the processing logic of process 600 can receive a URL entered by the user via an address bar of a browser to retrieve a web page addressed by the URL. Subsequently, at block 603, the processing logic of process 600 may store the URL as a record in a history of records (e.g. a browsing history). In some embodiments, the URL may be stored in the history of records if at least a portion of the content addressed by the URL has been successfully accessed (or retrieved).

According to certain embodiments, each record in a browsing history may be a data structure including a URL accessed by a browser, a physical location indicating where the browser accessed the URL, and a timestamp indicating when the browser accessed the URL. The physical location may be determined base on where a device hosting the browser was located substantially when a web page was retrieved using the URL (e.g. when at least a portion of the web page has been retrieved or when retrieval of the web page is completed).

At block 605, the processing logic of process 600 may receive a request to present a history of records or location based records. For example, the processing logic of process 600 may receive the request from a user interface for presenting a history of records which have been updated (stored) with the latest browsing operations from a browser. In response, the processing logic of process 600 may identify a relationship structure among the history of records based on locations and, optionally, timestamps recorded in the history of records. A relationship structure my include groups of records from the history of records. Groups may be non-overlapping (i.e. no record is shared by more than two groups identified), or overlapping. Alternatively, the relationship structure may specify one or more isolated records from the history of records. An isolated record may not belong to any group of records identified from the relationship structure.

At block 607, in one embodiment, the processing logic of process 600 may present a history of records organized by locations and optionally also by timestamps, for example, according to a structure relationship identified from the records. The processing logic of process 600 may display a list (or other forms) of the history of records (or browsing history) indicating a hierarchy of organizations among the records, such as based on indented and/or expandable list items in bottom history view 307 of FIG. 3. Each expandable list item may be expanded into additional indented list items (i.e. organized user interface items) ordered according to the timestamps Optionally, at block 609, the processing logic of process 600 may show the relationship structure of the history of records, such as location based clusters of records. In some embodiments, the processing logic of process may optionally exclude isolated records which were not identified within the clusters, i.e. determined to be outside of any of the clusters. The processing logic of process 600 may hide the isolated records from the display.

Figure 7:
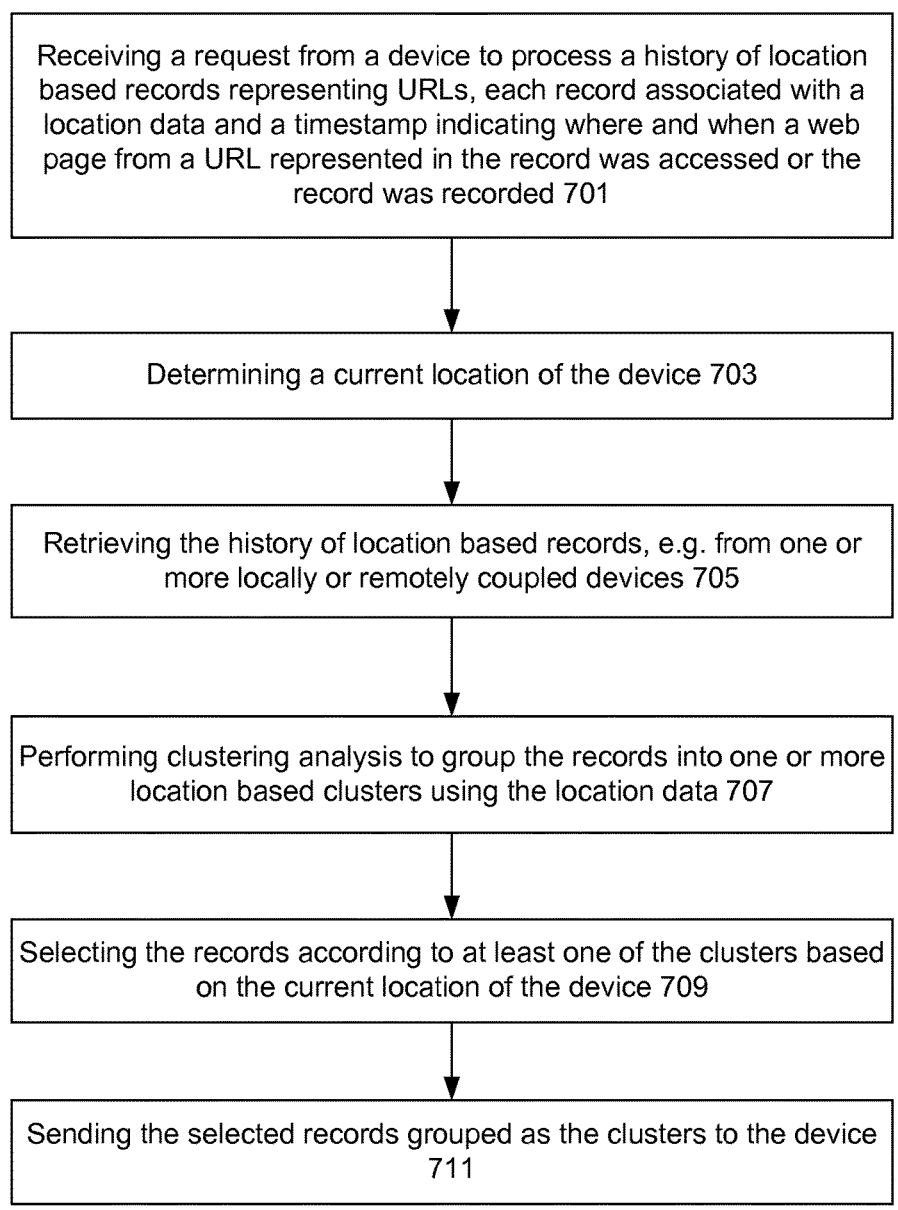
FIG. 7 is a flow diagram for grouping a history of URLs based on locations according to one embodiment of the invention.

FIG. 7 is a flow diagram for grouping a history of URLs based on locations according to one embodiment of the invention. Exemplary process 700 may be performed by a processing logic that may comprise hardware (circuitry, dedicated logic, etc.), software (such as is run on a dedicated machine), or a combination of both. For example, process 700 may be performed by some components of system 100 of FIG. 1. At block 701, the processing logic of process 700 can receive a request from a device to process a history of location based records. Each record may represent a URL or other data related to a web page. Additionally, each record may be associated with a location data and a timestamp indicating where and when a web page (or content) addressed in the URL was accessed or retrieved (or when the record was recorded), such as history of records 113 of FIG. 1. The processing logic of process 700 may receive the request for the history of records from a client device remotely coupled via a network. At block 703, optionally, the processing logic of process 700 may determine a current location of the device, such as a physical location based on geolocation data or GPS data for the device. For example, the request may include the geolocation or GPS data of the device.

At block 705, in one embodiment, the processing logic of process 700 may retrieve a history of location based records from one or more locally or remotely coupled devices, for example, according to an identity determined from a request received. The identity may be associated with a user operating a device where the request originates from. The history of location based records may be collected via one a more client devices (e.g. running browsers) over a period of time and stored in one or more devices, e.g. storage devices. In one embodiment, the history of records may be synchronized from multiple client devices which may have caused the collection of the records at different points in time (e.g. including the latest collected record). The processing logic of process 700 may retrieve at least a portion of the history of records from the device where the request has been received from.

At block 707, the processing logic of process 700 may perform clustering analysis to group a history of records into one or more location based clusters using the location data associated with each record. In one embodiment, the processing logic of process 700 may receive configuration settings for the clustering analysis from a device where a request was received for the clustering analysis. Alternatively, the processing logic of process 700 may retrieve the configuration settings registered for an identifier associated with the received request. The processing logic of process 700 may perform the clustering analysis in a server in response to a request from a remote client. Alternatively, the processing logic of process 700 may perform the clustering analysis in a client device running an application, such as a browser, associated with the history of records.

At block 709, the processing logic of process 700 may select records from a history of records according to at least one of location based clusters identified from the history of records. In one embodiment, the selection may be based on comparing a current location of a device (e.g. the device sending a request for the history of records) and representative locations for the clusters of records. For example, the processing logic of process 700 may select a cluster having a representative location, such as based on a centorid of locations of the records a cluster, closest to the current location of the device.

The processing logic of process 700 may consider maximum and/or minimum distances from a current location of a device for cluster selection. In some embodiments, a selected cluster may be located, according to a representative location of the cluster, within the maximum distance of the current location of the device. Alternatively, more than one clusters located within a minimum distance from the current location of the device may be selected. At block 711, the processing logic of process 700 may send the selected records grouped as the clusters to the device. Alternatively, the processing logic of process 700 may send the history of records retrieved together with the results of the clustering analysis, e.g. which record belonging to which cluster.

Figure 8:
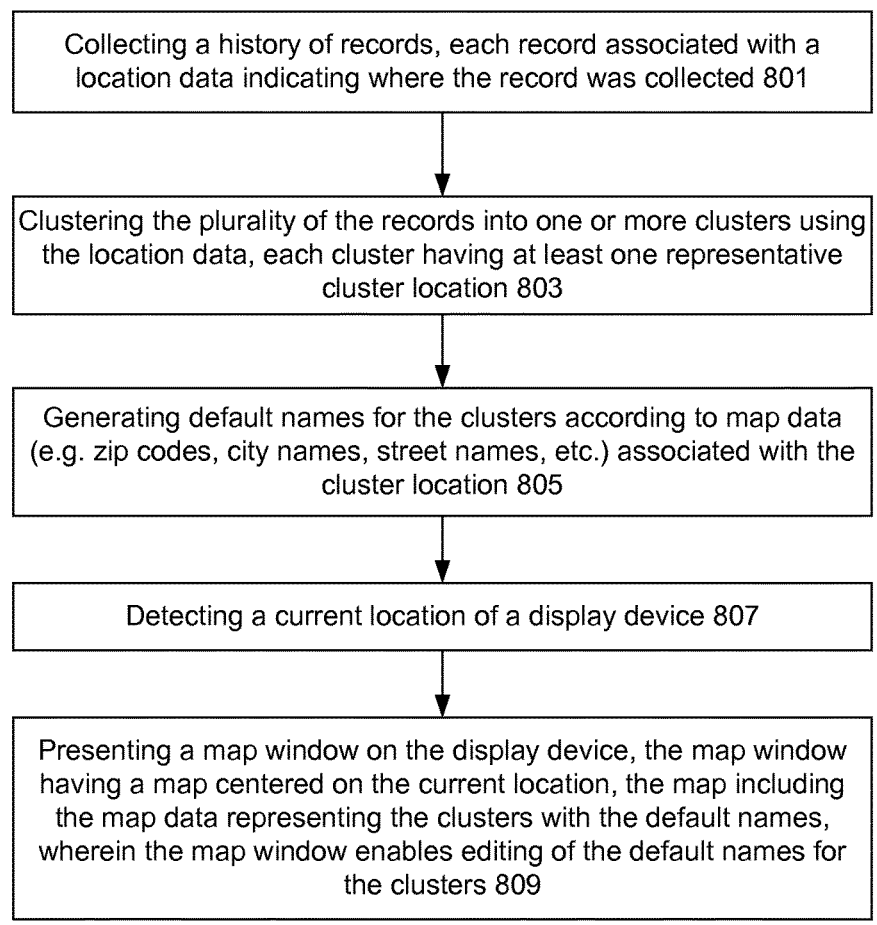
FIG. 8 is a flow diagram for naming groups of a history of URLs based on locations according to one embodiment of the invention.

FIG. 8 is a flow diagram for naming groups of a history of URLs based on locations according to one embodiment of the invention. Exemplary process 800 may be performed by a processing logic that may comprise hardware (circuitry, dedicated logic, etc.), software (such as is run on a dedicated machine), or a combination of both. For example, process 800 may be performed by some components of system 100 of FIG. 1. At block 801, the processing logic of process 800 can collect a history of records, each record associated with a location data indicating where the record was recorded. The history of records may be collected over a most recent period of time. Alternatively, the history of records may be collected over certain periods of time in the past (e.g. as specified).

At block 803, in one embodiment, the processing logic of process 800 may cluster the plurality of the records into one or more clusters using location data associated with the records, such as based on cluster identification module 109 of FIG. 1. Each cluster having at least one representative cluster locations, such as based on a centroid based on locations of the records grouped within one cluster. In one embodiment, the processing logic of process 800 may perform clustering operations in response to, for example, a user request. Alternatively, the processing logic of process 800 may incrementally perform the clustering analysis as new location based records are collected (e.g. whenever a new record arrives or a predetermined number of records have been collected). Optionally, the clustering analysis may be performed according to a configured schedule and/or periodically.

In one embodiment, at block 805, the processing logic of process 800 may automatically generate default names for clusters identified from a history of records. For example, information from a map, such as map data 117 of FIG. 1, may be applied for the default names. In some embodiments, map data may include information such as zip codes, city names, street names, or names for other units of map locations. The processing logic of process 800 may select map data near a representative location of a cluster for naming the cluster. Multiple data may be combined together to generate a default name uniquely for a cluster.

In some embodiments, the processing logic of process 800 may determine human-readable address corresponding to a central location or representative location within a cluster according to reverse geocoding process. The processing logic of process 800 may perform back (reverse) coding of a point location (latitude, longitude) of the representative location of a cluster to a readable address or place name to include identification or a portion of the identification of nearby street addresses, places, and/or area subdivisions such as neighborhoods, county, state, or country, e.g. based on map data. The readable address can be used as the default name for a location cluster folder without a need to be named by a user. Thus, requirements for user configurations can be minimized or eliminated (e.g. with "zero-configuration" feature).

The processing logic of process 800 may detect a current location of a device at block 807 for presenting identified clusters from a history of records using default names. The device may be associated with a display device or display screen for the presentation. In one embodiment, the processing logic of process 800 may present a map window on the display device showing a map centered on the current location at block 809. The map may be zoomed in an area according to the screen size of the display device to cover the identified clusters with the default names. In one embodiment, the map may be centered on a location and automatically zoomed to an area large enough to cover the identified clusters and individual records in the history of records within the map window (or display screen). The map window may provide user interfaces to enable a user to edit the generated default names for the clusters.

Figure 9:
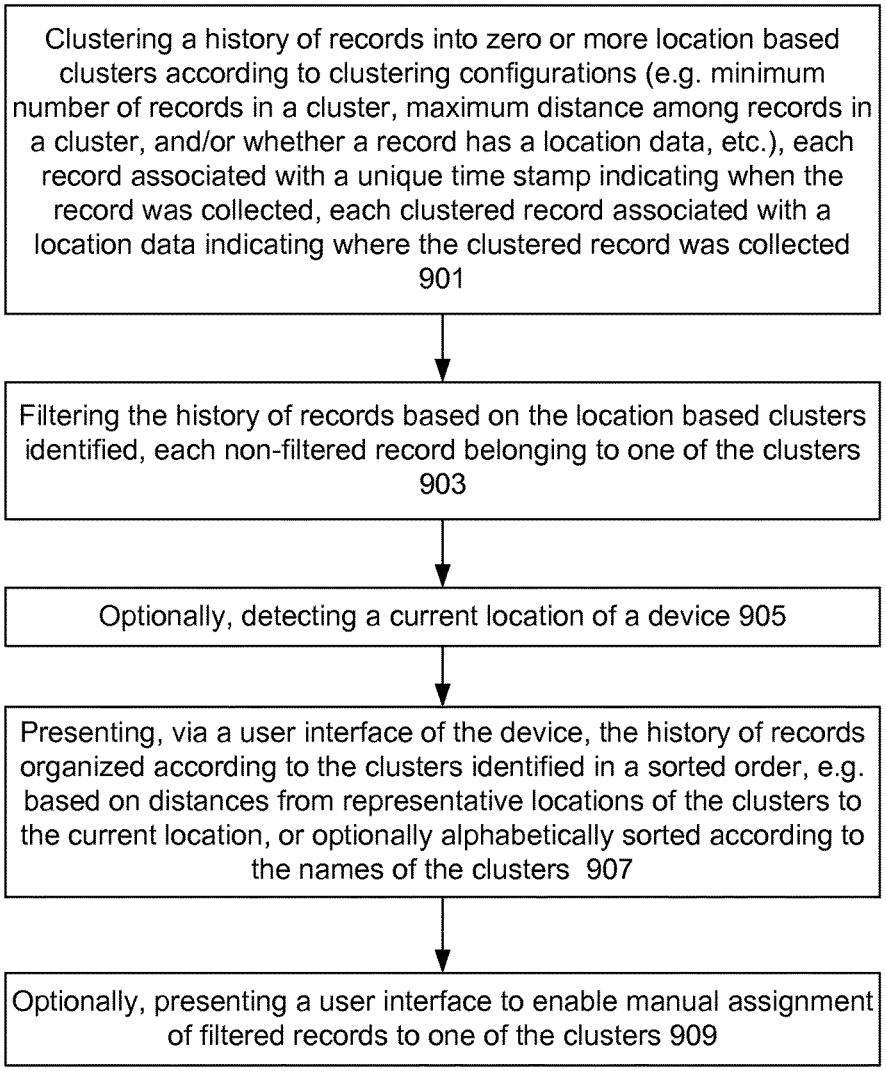
FIG. 9 is a flow diagram for filtering a history of records based on locations according to one embodiment of the invention.

FIG. 9 is a flow diagram for filtering a history of records, such as URLs in a browsing history, based on locations according to one embodiment of the invention. Exemplary process 900 may be performed by a processing logic that may comprise hardware (circuitry, dedicated logic, etc.), software (such as is run on a dedicated machine), or a combination of both. For example, process 900 may be performed by some components of system 100 of FIG. 1. At block 901, the processing logic of process 900 may cluster a history of records according to clustering configurations. The processing logic of process 900 may allow a user to customize location based clustering operations according the clustering configurations, for example, including a minimum number of records in a cluster, a maximum distance among records in a cluster, whether a record has a location data, selection of distance measure functions, and/or other application clustering settings. The clustering configurations may be stored in a client device or one or more servers remotely coupled to a client device.

Each record in a history of records may be associated with a unique timestamp indicating when the record was collected. In one embodiment, a portion of the history of records may not be associated with location data. For example, a browser user may opt out of location capability for a device to hide the current location of the device for privacy purpose. As a result, browsing URLs collected for the device without the location capability may not be associated with location data. In one embodiment, each record assigned to a cluster (or clustered record) may include a location data indicating where the record was collected.

At block 903, the processing logic of process 900 may filter a history of records according to location based clusters identified. Each record which is not filtered (or non-filtered record) may belong to one of the clusters identified. A filtered record may be associated with a location data but not assigned to any cluster identified. For example, the filtered record may be located outside a configured distance relative to each cluster location (or representative location) of the clusters. Alternatively, there may not be enough number of filtered records located close by to form a cluster according to clustering configurations. In one embodiment, the processing logic of process 900 may group those records which are not associated with location data together, e.g. as a no-location group. The processing logic of process 900 may filter each record in the no-location group.

At block 905, in one embodiment, the processing logic of process 900 may optionally detect a current location of a device, for example, based on location determination module 105 of FIG. 1. The device may be used to present a history of records based on locations in a graphical manner. Alternatively, the device may host an application (e.g. a browser) associated with the history of records (e.g. URLs). Determination of the current location of the device may be substantially synchronized with the presentation of the history of records via the device.

In one embodiment, at block 907, the processing logic of process 900 may present a history of records via a user interface of a device. Presentation of the history of records may be organized according to clusters identified in a sorted order, e.g. based on distances from representative locations of the clusters to a current location of the device. Or, optionally, the history of records may be presented in an alphabetically sorted order according to names of the clusters. In some embodiments, filtered records may be grouped together in the presentation. Alternatively, the presentation may indicate a group of records without location data. In one embodiment, at block 909, the processing logic of process 900 may present a user interface to enable manual assignment of filtered records to one of the clusters identified. For example, a user may be allowed to assign a record without location data to one of the clusters identified, e.g. using drag and drop user interface operations.

Figure 10A:
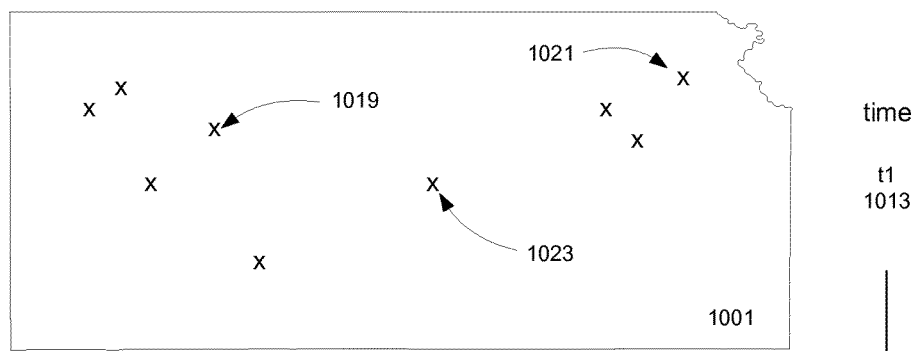
FIGS. 10A-10C are sequence diagrams illustrating changes in location based clusters over time according to one embodiment of the invention.
Figure 10B:
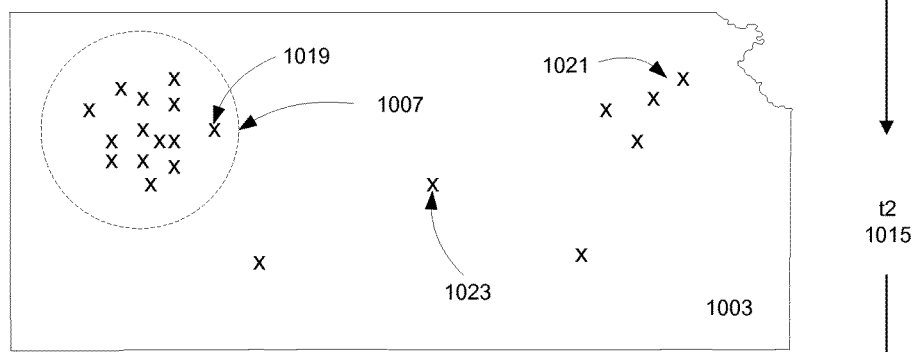
Figure 10C:
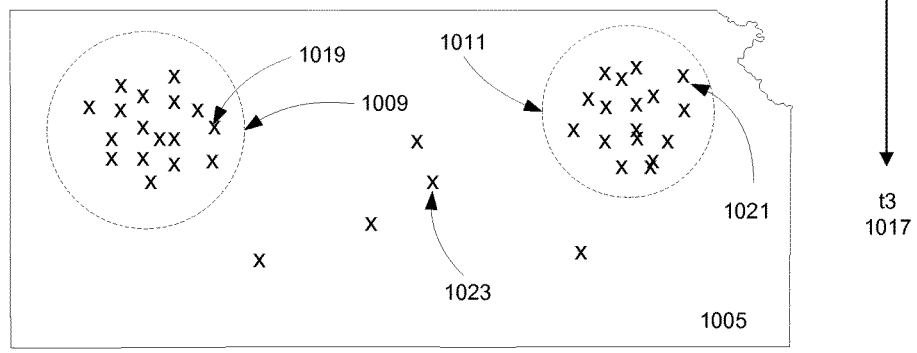

FIGS. 10A-10C are sequence diagrams illustrating changes in location based clusters over time according to one embodiment of the invention. For example, sequence 1000 may be based on system 100 of FIG. 1 at different points in time. Map 1001 in FIG. 10A may include location based representations of a history of records collected at time t1 1013, e.g. for a browsing history in a device running a browser. Each record, such as records 1019, 1021, 1023 may be associated with location data corresponding to where the records are located in map 1001. In one embodiment, at time t1, no clusters may be identified from the history of records, for example, according to clustering configurations having constraints on how close together a group of records should be, how many records are needed (minimum number), and/or other applicable heuristics rules on whether a group of records may form a cluster.

FIG. 10B shows additional records collected at time t2 1015 subsequent to time t1. According to one embodiment, cluster 1007 including record 1019 may be identified at time t2. Records 1021 and 1023, for example, may not belong to any cluster identified at time t2. Turning now to FIG. 10C, as more records were collected subsequent to time t2 1015, clusters 1009, 1011 can be identified from a history of records at time t3 1017. In one embodiment, record 1021 may be grouped into cluster 1011 at time t3 1017. Other records, such as record 1023 still does not belong to any cluster at time t3. A record in one embodiment can belong to one cluster at one time and may belong to a different cluster at a later time, for example, as more records are collected, as clustering configurations have been changed, and/or if clusters are analyzed for groups within a cluster. Representative locations or cluster locations of cluster 1007 and cluster 1009 may differ because of difference in the collections or groups of records included. In some embodiments, two records of a history of records may belong to different clusters identified from the history of records at different points in time.

Figure 11:
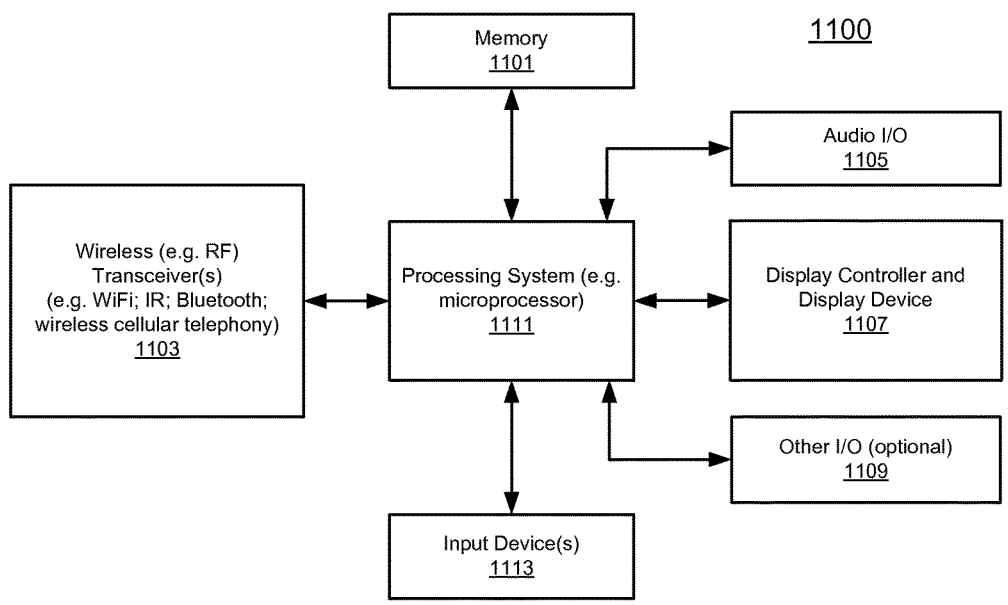
FIG. 11 shows one example of a data processing system which may be used with the embodiments described herein.

FIG. 11 shows one example of a data processing system which may be used with the embodiments described herein. The data processing system 1100 shown in FIG. 11 includes a processing system 1111, which may be one or more microprocessors, or which may be a system on a chip integrated circuit, and the system also includes memory 1101 for storing data and programs for execution by the processing system. The system 1100 also includes an audio input/output subsystem 1105 which may include a microphone and a speaker for, for example, playing back music or providing telephone functionality through the speaker and microphone. In one embodiment, the system 1100 may be the device for system 100 shown in FIG. 1.

A display controller and display device 1107 provide a visual user interface for the user; this digital interface may include a graphical user interface which is similar to that shown on a Macintosh computer when running OS X operating system software. The system 1100 also includes one or more wireless transceivers 1103 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 1100 in certain embodiments, and in certain embodiments fewer components than shown in FIG. 11 may also be used in a data processing system.

The data processing system 1100 also includes one or more input devices 1113 which are provided to allow a user to provide input to the system. These input devices may be a keypad or a keyboard or a touch panel or a multi touch panel. The data processing system 1100 also includes an optional input/output device 1115 which may be a connector for a dock. It will be appreciated that one or more buses, not shown, may be used to interconnect the various components as is well known in the art. The data processing system shown in FIG. 11 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 1100 may be a network computer or an embedded processing device within another device, or other types of data processing systems which have fewer components or perhaps more components than that shown in FIG. 11.

Figure 12:
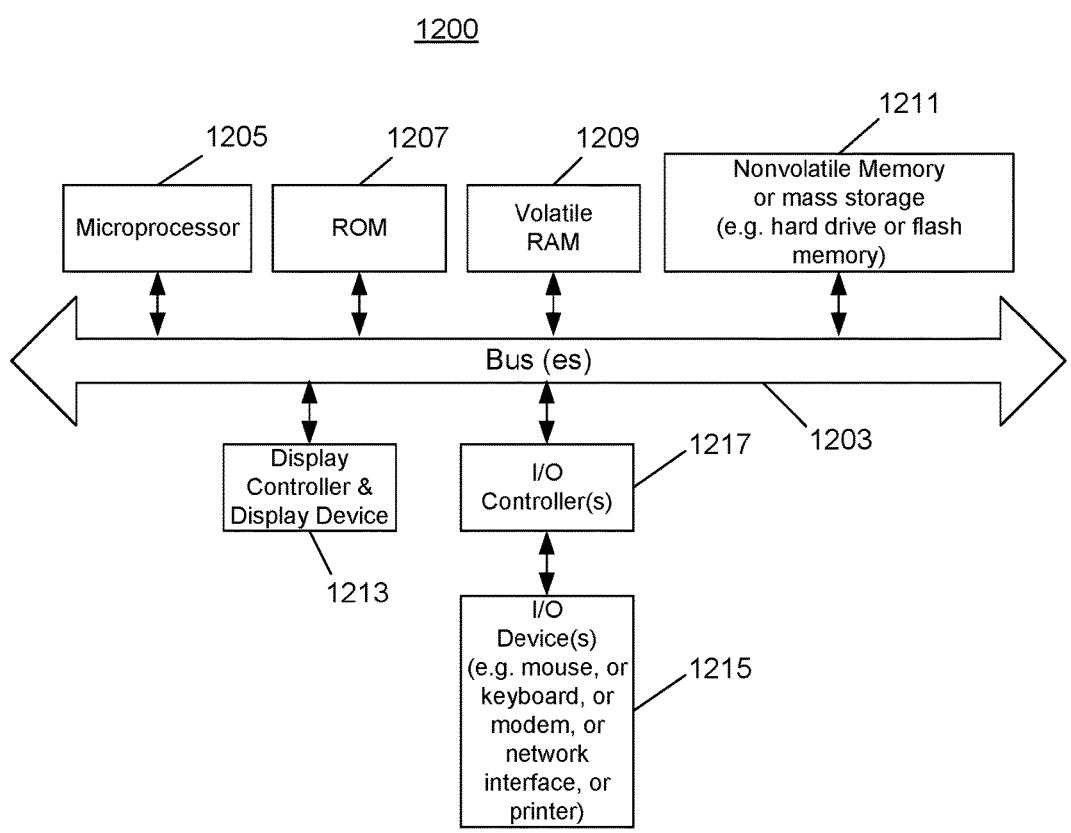
FIG. 12 illustrates another example of a data processing system which may be used in conjunction with the embodiments described herein.

FIG. 12 shows another example of a data processing system which may be used with one embodiment of the present invention. Note that while FIG. 12 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. FIG. 12 may represent the server system shown in FIG. 1.

As shown in FIG. 12, the computer system 1200, which is a form of a data processing system, includes a bus 1203 which is coupled to a microprocessor(s) 1205 and a ROM (Read Only Memory) 1207 and volatile RAM 1209 and a non-volatile memory 1211. The microprocessor 1205 may retrieve the instructions from the memories 1207, 1209, 1211 and execute the instructions to perform operations described above. The bus 1203 interconnects these various components together and also interconnects these components 1205, 1207, 1209, and 1211 to a display controller and display device 1213 and to peripheral devices such as input/output (I/O) devices which may be mice, keyboards, modems, network interfaces, printers and other devices which are well known in the art. Typically, the input/output devices 1215 are coupled to the system through input/output controllers 1217. The volatile RAM (Random Access Memory) 1209 is typically implemented as dynamic RAM (DRAM) which requires power continually in order to refresh or maintain the data in the memory.

The mass storage 1211 is typically a magnetic hard drive or a magnetic optical drive or an optical drive or a DVD RAM or a flash memory or other types of memory systems which maintain data (e.g. large amounts of data) even after power is removed from the system. Typically, the mass storage 1211 will also be a random access memory although this is not required. While FIG. 12 shows that the mass storage 1211 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 1203 may include one or more buses connected to each other through various bridges, controllers and/or adapters as is well known in the art.

The term "memory" as used herein is intended to encompass all volatile storage media, such as dynamic random access memory (DRAM) and static RAM (SRAM). Computer-executable instructions can be stored on non-volatile storage devices, such as magnetic hard disk, an optical disk, and are typically written, by a direct memory access process, into memory during execution of software by a processor. One of skill in the art will immediately recognize that the term "machine-readable storage medium" includes any type of volatile or non-volatile storage device that is accessible by a processor.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

In the foregoing specification, the invention has been described with reference to specific exemplary embodiments thereof. It will be evident that various modifications may be made thereto without departing from the broader scope of the invention as set forth in the following claims. The specification and drawings are, accordingly, to be regarded in an illustrative sense rather than a restrictive sense.

What is claimed is:

1. A machine implemented method comprising:
   storing a history of records for a browsing history, each record including a Universal Resource Locator (URL) and location data, the location data indicating where a device was physically located when the device accessed a web page using the URL;
   forming clusters of the records based on the location data in the records;
   automatically determining for each cluster of records a representative location based on a center or centroid of the cluster;
   automatically naming the representative location based on map data; and
   presenting the named representative location on the device.

2. The method of claim 1, wherein one or more named representative locations are represented on a map by one or more markers, respectively.

3. The method of claim 2, further comprising:
   displaying two views on the device, a first view displaying the map and one or more markers and a second view displaying a list of the named representative locations.

4. The method of claim 3, wherein the list of named representative locations is sorted based on a distance between the named representative locations and a current location of the device.

5. The method of claim 3, further comprising:
   receiving first input selecting a named representative location from the list; and
   responsive to the first input, presenting on the device two or more records in the cluster associated with the named representative location.

6. The method of claim 5, wherein the two or more records in the cluster are presented in chronological order based on timestamps in the records.

7. The method of claim 5, further comprising:
   presenting the two or more records as web pages on a display of the device;
   receiving second input; and
   responsive to the second input, moving the web pages on the display, wherein during the moving, content of at least one webpage is visible and content of at least one other web page is obscured.

8. The method of claim 1, wherein the history of records includes one or more records obtained by synchronizing with one or more other devices.

9. The method of claim 1, further comprising:
   determining frequently visited web pages based on the records; and
   presenting the frequently visited web pages in the records.

10. An apparatus comprising:
    one or more processors;
    memory coupled to the one or more processors and configured to store instructions, which, when executed by the one or more processors, cause the one or more processors to perform operations comprising:
      storing a history of records for a browsing history, each record including a Universal Resource Locator (URL) and location data, the location data indicating where a device was physically located when the device accessed a web page using the URL;
      forming clusters of the records based on the location data in the records;
      automatically determining for each cluster of records a representative location based on a center or centroid of the cluster;
      automatically naming the representative location based on map data; and
      presenting the named representative location on the device.

11. The apparatus of claim 10, wherein one or more named representative locations are represented on a map by one or more markers, respectively.

12. The apparatus of claim 11, wherein the operations further comprise:
    displaying two views on the device, a first view displaying the map and one or more markers and a second view displaying a list of the named representative locations.

13. The apparatus of claim 11, wherein the list of named representative locations is sorted based on a distance between the named representative locations and a current location of the device.

14. The apparatus of claim 11, wherein the operations further comprise:
    receiving first input selecting a named representative location from the list; and
    responsive to the first input, presenting on the device two or more records in the cluster associated with the named representative location.

15. The apparatus of claim 14, wherein the two or more records in the cluster are presented in chronological order based on timestamps in the records.

16. The apparatus of claim 14, wherein the operations further comprise:
    presenting the two or more records as web pages on a display of the device;
    receiving second input; and
    responsive to the second input, moving the web pages on the display, wherein during the moving content of at least one webpage is visible and content of at least one other web page is obscured.

17. The apparatus of claim 10, wherein the history of records includes one or more records obtained by synchronizing with one or more other devices.

18. The apparatus of claim 10, wherein the operations further comprise:
   determining frequently visited web pages based on the records; and
   presenting the frequently visited web pages in the records.

19. A non-transitory, computer-readable storage medium, having instructions stored thereon, which, when executed by one or more processors, causes the one or more processors to perform operations comprising:
   storing a history of records for a browsing history, each record including a Universal Resource Locator (URL) and location data, the location data indicating where a device was physically located when the device accessed a web page using the URL;
   forming clusters of the records based on the location data in the records;
   automatically determining for each cluster of records a representative location based on a center or centroid of the cluster;
   automatically naming the representative location based on map data; and
   presenting the named representative location on the device.

20. The non-transitory, computer-readable storage medium of claim 19, wherein one or more named representative locations are represented on a map by one or more markers, respectively.

* * * * *